United States Patent
Holmes et al.

(10) Patent No.: US 7,061,398 B2
(45) Date of Patent: Jun. 13, 2006

(54) TWO-WAY WIDE AREA TELEMETRY

(75) Inventors: John K. Holmes, Tulsa, OK (US); Steven D. Bragg, Owasso, OK (US)

(73) Assignee: BS&B Safety Systems Limited, Limerick (IE)

( * ) Notice: Subject to any disclaimer, the term of this patent is extended or adjusted under 35 U.S.C. 154(b) by 479 days.

(21) Appl. No.: 10/161,245

(22) Filed: May 31, 2002

(65) Prior Publication Data
US 2003/0016142 A1    Jan. 23, 2003

Related U.S. Application Data

(63) Continuation-in-part of application No. 09/375,119, filed on Aug. 16, 1999, now abandoned.

(51) Int. Cl.
G08C 19/16 (2006.01)
(52) U.S. Cl. .................. 340/870.01; 340/870.07; 455/226.2
(58) Field of Classification Search ........... 340/870.02, 340/870.07, 870.01; 455/226.2, 226.4
See application file for complete search history.

(56) References Cited

U.S. PATENT DOCUMENTS

| | | |
|---|---|---|
| 4,008,458 A | 2/1977 | Wensley |
| 4,264,897 A | 4/1981 | Farnsworth |
| 4,296,411 A | 10/1981 | Romanelli et al. |
| 4,315,248 A | 2/1982 | Ward |
| 4,350,980 A | 9/1982 | Ward |
| 4,388,690 A | 6/1983 | Lumsden |
| 4,463,354 A | 7/1984 | Sears |
| 4,495,596 A | 1/1985 | Sciulli |
| 4,567,563 A | 1/1986 | Hirsch |
| 4,614,945 A | 9/1986 | Brunius et al. |
| 4,646,084 A | 2/1987 | Burroews et al. |
| 4,654,662 A | 3/1987 | Van Orsdel |
| 4,692,761 A | 9/1987 | Robinton |
| 4,724,435 A | 2/1988 | Moses et al. |
| 4,749,992 A | 6/1988 | Fitzemeyer et al. |
| 4,780,910 A | 10/1988 | Huddleston et al. |
| 4,799,059 A | 1/1989 | Grindahl et al. |
| 4,804,938 A | 2/1989 | Rouse et al. |

(Continued)

FOREIGN PATENT DOCUMENTS

DE          2 613 739 A1        3/1976

(Continued)

OTHER PUBLICATIONS

Wayne W. Manges, Glenn O. Allgood, Stephen F. Smith, Timothy J. McIntyre, and Michael R. Moore, *Intelligent Wireless Sensors For Industrial Manufacturing*, http://www.sensormag.com/articles/0400/44/main.shtml.

(Continued)

*Primary Examiner*—Timothy Edwards, Jr.
(74) *Attorney, Agent, or Firm*—Finnegan, Henderson, Farabow, Garrett & Dunner, LLP

(57) ABSTRACT

A method and apparatus for two-way telemetry is provided. For one embodiment, a telemetry interface module may receive data regarding the strength of transmitted signals. The telemetry interface module may transmit a query message to another telemetry interface module and receive a reply message containing received signal strength indicator (RSSI) data for the query message as received by the other telemetry interface module. For one embodiment, a telemetry interface module may adjust a transmission power level. For one embodiment, a telemetry interface module may select between a plurality of antennae for reception and transmission.

19 Claims, 14 Drawing Sheets

U.S. PATENT DOCUMENTS

| | | | |
|---|---|---|---|
| 4,811,011 A | 3/1989 | Sollinger | |
| 4,817,131 A | 3/1989 | Thornborough et al. | |
| 4,839,642 A | 6/1989 | Batz et al. | |
| 4,850,010 A | 7/1989 | Stanbury et al. | |
| 4,866,761 A | 9/1989 | Thornborough et al. | |
| 4,940,976 A | 7/1990 | Gastouniotis et al. | |
| 5,053,766 A | 10/1991 | Ruiz-del-Portal et al. | |
| 5,086,292 A | 2/1992 | Johnson et al. | |
| 5,107,440 A | 4/1992 | Callahan et al. | |
| 5,136,613 A | 8/1992 | Dumestre, III | |
| 5,179,569 A | 1/1993 | Sawyer | |
| 5,194,860 A | 3/1993 | Jones et al. | |
| 5,204,896 A | 4/1993 | Oliver | |
| 5,270,704 A | 12/1993 | Quintana et al. | |
| 5,432,507 A | 7/1995 | Mussino et al. | |
| 5,438,329 A | 8/1995 | Gastouniotis et al. | |
| 5,448,230 A | 9/1995 | Schanker et al. | |
| 5,451,938 A | 9/1995 | Brennan, Jr. | |
| 5,475,867 A | 12/1995 | Blum | |
| 5,481,259 A | 1/1996 | Bane | |
| 5,485,150 A | 1/1996 | Hisanaga et al. | |
| 5,491,473 A | 2/1996 | Gilbert | |
| 5,493,287 A | 2/1996 | Bane | |
| 5,495,239 A | 2/1996 | Ouellette | |
| 5,523,751 A | 6/1996 | Byford et al. | |
| 5,528,507 A | 6/1996 | McNamara et al. | |
| 5,528,675 A | 6/1996 | Chen | |
| 5,541,589 A | 7/1996 | Delaney | |
| 5,553,094 A | 9/1996 | Johnson et al. | 375/200 |
| 5,559,870 A | 9/1996 | Patton et al. | |
| 5,590,179 A | 12/1996 | Shincovich et al. | |
| 5,602,744 A | 2/1997 | Meek et al. | |
| 5,615,261 A * | 3/1997 | Grube et al. | 380/2 |
| 5,617,084 A | 4/1997 | Sears | |
| 5,631,636 A | 5/1997 | Bane | |
| 5,659,300 A | 8/1997 | Dresselhuys et al. | |
| 5,659,303 A | 8/1997 | Adair, Jr. | |
| 5,661,463 A | 8/1997 | Letchak et al. | |
| 5,673,252 A | 9/1997 | Johnson et al. | |
| 5,684,472 A | 11/1997 | Bane | |
| 5,686,902 A * | 11/1997 | Reis et al. | 340/10.2 |
| 5,697,056 A * | 12/1997 | Tayloe | 455/513 |
| 5,781,538 A * | 7/1998 | Ganesan et al. | 370/310 |
| 5,883,886 A | 3/1999 | Eaton et al. | |
| 6,124,806 A | 9/2000 | Cunningham et al. | |
| 6,255,962 B1 | 7/2001 | Tanenhaus et al. | |
| 6,333,975 B1 * | 12/2001 | Brunn et al. | 379/106.03 |
| 6,337,971 B1 | 1/2002 | Abts | |
| 6,369,715 B1 | 4/2002 | Bennett, Jr. et al. | 340/618 |
| 6,532,359 B1 * | 3/2003 | Lin | 455/277.1 |
| 6,657,549 B1 * | 12/2003 | Avery | 340/825.49 |
| 6,657,976 B1 * | 12/2003 | Larghi | 370/278 |
| 6,778,099 B1 * | 8/2004 | Meyer et al. | 340/870.02 |
| 2002/0071478 A1 * | 6/2002 | Cornwall et al. | 375/132 |

FOREIGN PATENT DOCUMENTS

| | | |
|---|---|---|
| EP | 0 629 098 A2 | 12/1994 |
| WO | WO 0101366 A2 | 1/2001 |

OTHER PUBLICATIONS

*Omnex Cordless Wire™ Connections Since 1986*, http://www.omnexcontrols.com/wireless/downloads/hs900datasheet.pdf.

* cited by examiner

TWO-WAY WIDE AREA TELEMETRY

CROSS REFERENCE TO RELATED APPLICATION

This patent application is a continuation-in-part patent application of U.S. Application No. 09/375,119, filed Aug. 16, 1999, now abandoned.

FIELD OF THE INVENTION

The present invention is directed to the field of remote monitoring of equipment, specifically remote monitoring of equipment using telemetry.

BACKGROUND OF THE INVENTION

Telemetry devices have been successfully utilized in automated meter reading (AMR) applications. In such applications, a telemetry device typically transmits utility usage information to remote data collection modules which, in turn, transmit the information back, often over the Internet, to a central data collection facility. Telemetry devices are typically transmit-only devices in order to keep costs low and reduce power consumption.

The telemetry devices typically transmit data on a timed basis or on the occurrence of an event, such as a pulse received from the meter being read. An AMR system may utilize multiple data collection modules that may receive a transmission from the same telemetry device, in an effort to enhance reliability of data transmissions. An arbitration scheme may be utilized to determine which data collection module receiving data from the same telemetry device forwards the data to the central data collection facility. Further, data may be transmitted multiple times in an effort to ensure at least one of the transmissions is successfully received by a data collection module.

While transmit-only telemetry devices may be adequate for AMR applications, they suffer a number of disadvantages compared to two-way telemetry devices. First, transmit-only telemetry devices do not allow for two-way handshaking between the transmitting device and the receiving device. Two-way handshaking may increase reliability of data transmissions. Further, a transmit-only telemetry device may not be polled by another telemetry device. Finally, a transmit-only telemetry device may not receive useful information from another telemetry device, such as information regarding the strength of signals transmitted from the transmit-only telemetry device.

SUMMARY OF THE INVENTION

An embodiment of the present invention is a method for two-way telemetry. The method includes transmitting a query message from a first telemetry interface module to a second telemetry interface module, reading received signal strength indicator (RSSI) data of the query message by the second telemetry interface module, and transmitting a reply message containing the RSSI data from the second telemetry interface module to the first telemetry interface module. In response to the received signal strength data contained in the reply message, the first telemetry interface module may adjust a transmission power and/or select an antenna from a plurality of antennae for future transmissions.

Another embodiment of the present invention is a two-way telemetry interface module. The two-way telemetry interface module may comprise a processor, memory, power supply, receiver, transmitter and one or more internal antennae. The module may comprise a connection for an external antenna. The one or more antennae may Embodiments of the two-way telemetry interface module may include a wireless end device, a data interface module for a controller, and a telemetry repeater module.

DETAILED DESCRIPTION

The following detailed description sets forth an embodiment or embodiments in accordance with the present invention. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

An Exemplary Wide Area Telemetry System

Figure 1:
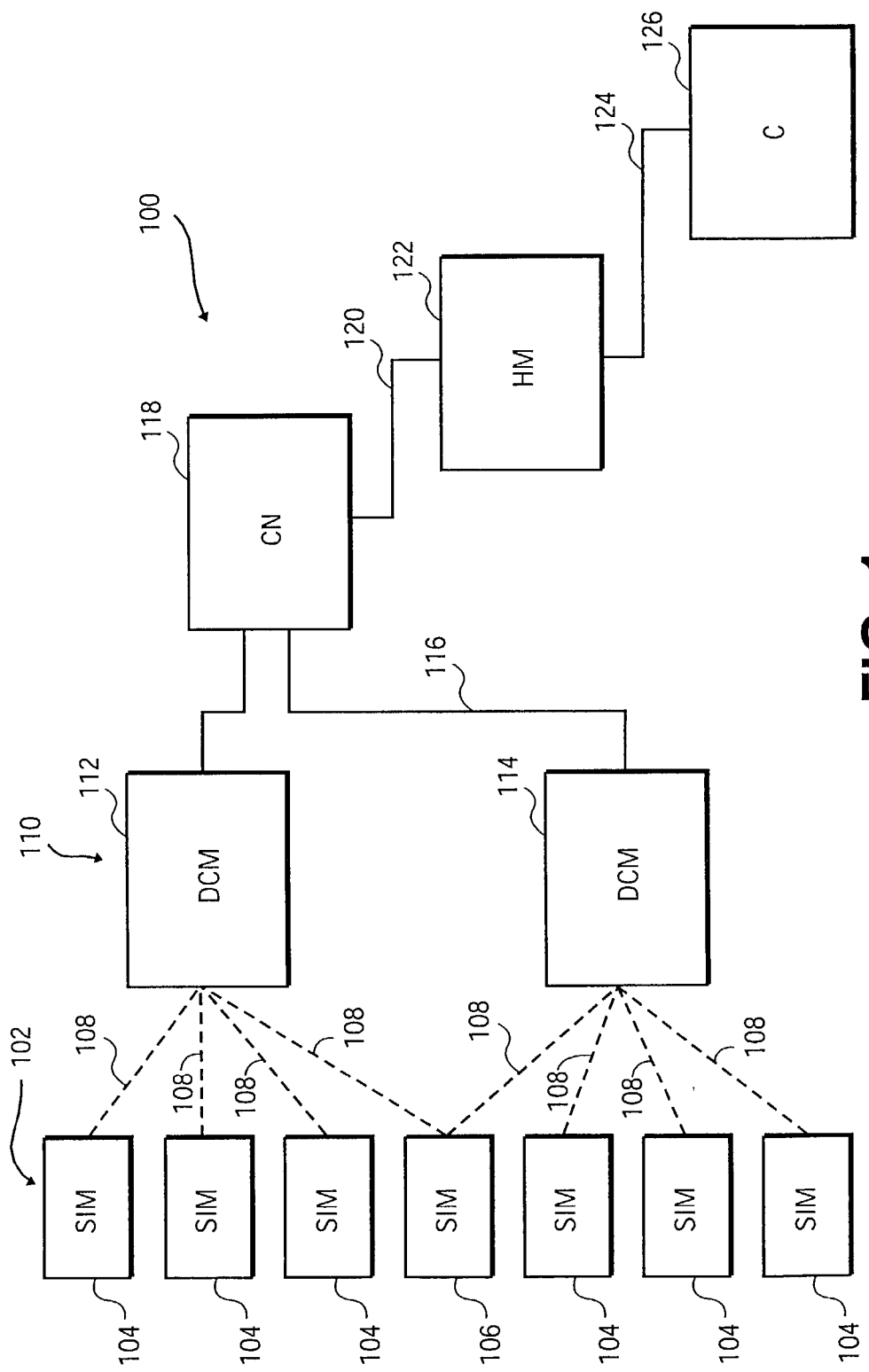
FIG. 1 shows a block diagram of an exemplary wide area telemetry system.

Referring to the drawings in detail, FIG. 1 is a schematic representation for a wide-area telemetry system 100, constructed in accordance with the present invention. A plurality of sensor interface modules 102, which are electromechanical interfaces, act as data gathering equipment.

Sensor interface modules 102 communicate with data collection modules 110 through a hardwire or wireless transmission 108. Standard wire connection may be utilized for the hardwire or wireless transmission 108, or various types of known, low-power, radio-frequency transmissions may be utilized. The preferred embodiment communicates by using a frequency-hopping spread-spectrum transmission in an unlicensed range, such as 902–928 Mhz.

The data collection modules 110 transmit the information received from the sensor interface modules 102 over a data module connection 116 to a network system 118. The network system 118 forwards the transmitted information over a network connection 120 to a host module 122 where the information is stored or processed. The stored or processed information may then be transmitted from the host module 122 through a host connection 124 to the customer interface 126.

The sensor interface modules 102 are intelligent communications devices which attach to gas, electric and water meters and other types of monitored equipment. The basic sensor interface modules 102 may be adapted to any number of systems to be monitored, including but not limited to: electrical systems, gas systems, water systems, security systems, temperature control systems, vending machines, and remotely monitored devices of any sort. The sensor interface modules 102 include an appropriate hardware sensor for the device being monitored; a computerized monitoring system with associated firmware; battery power supply and/or a converter for external power; and a transmitter.

Figure 2:
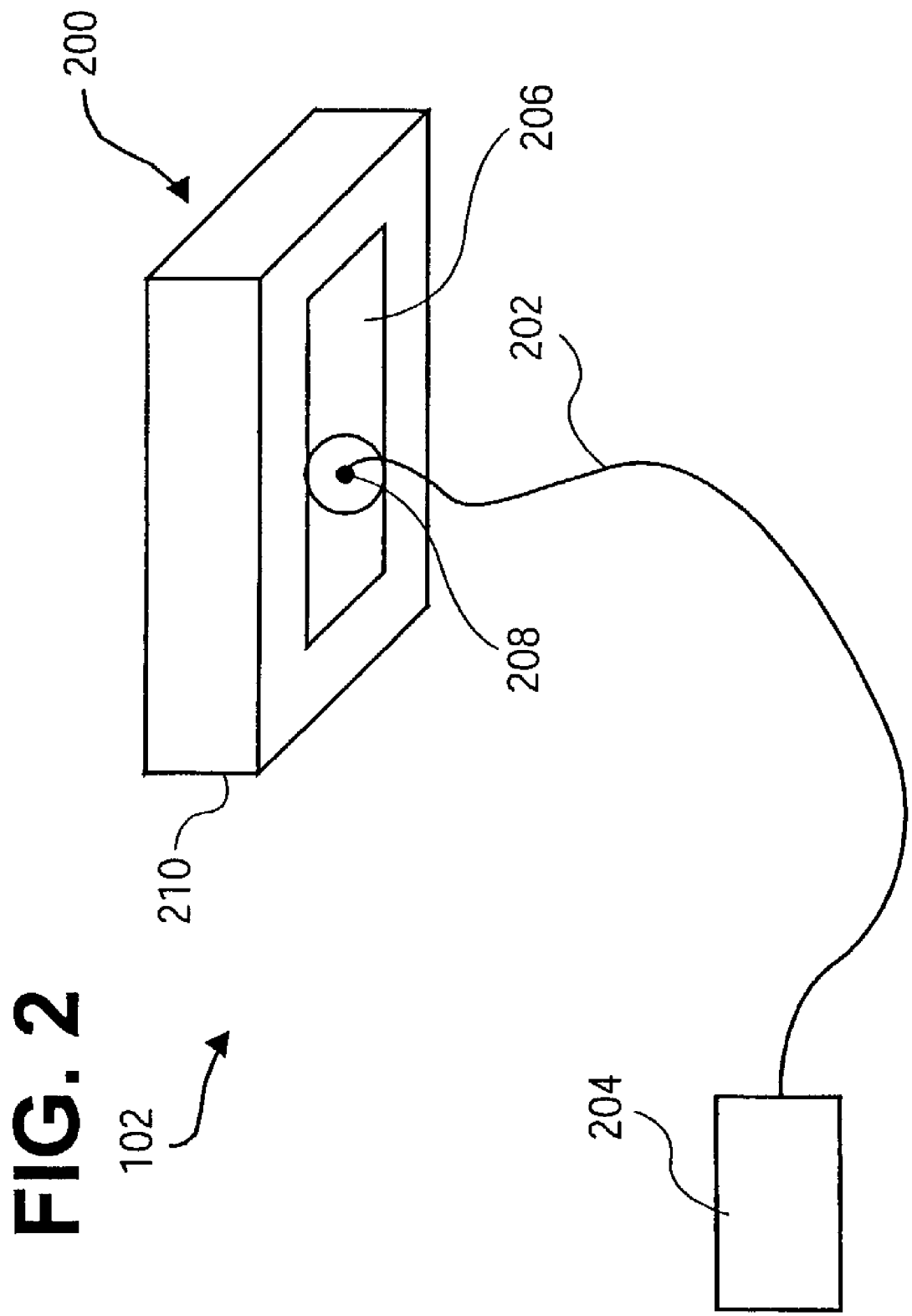
FIG. 2 shows a block diagram of one embodiment of a sensor interface module.

As shown in FIG. 2, the sensor interface module 102 can be made with a sensor interface main body 200, sensor connecting harness 202 and an external hardware sensor 204. The main body 200 consists of a sensor interface circuit board 206 with sensor connecting terminals 208 for attaching the sensor connecting harness 202 to the external hardware sensor 204. The main body 200 can be installed internally to the monitored device or can be made to fit in a small enclosure or casing 210 for external mounting on or in close proximity to the monitored device. The external hardware sensor 204 is mounted in a location suitable to the device being monitored and connected to the sensor interface circuit board 206 through the sensor connecting harness 202.

For gas meters, sensor interface module 102 will monitor rotation of the dials of the meter display. The small enclosure or casing 210 of the sensor interface module 102 may be mounted on the pipes or conduits surrounding the gas meter, or may be directly mounted on the meter. The sensor interface module 102 and the external hardware sensor may be integrated into the face plate of the meter to effectuate an efficient installation of the monitoring system on pre-existing meter installations.

Figure 3:
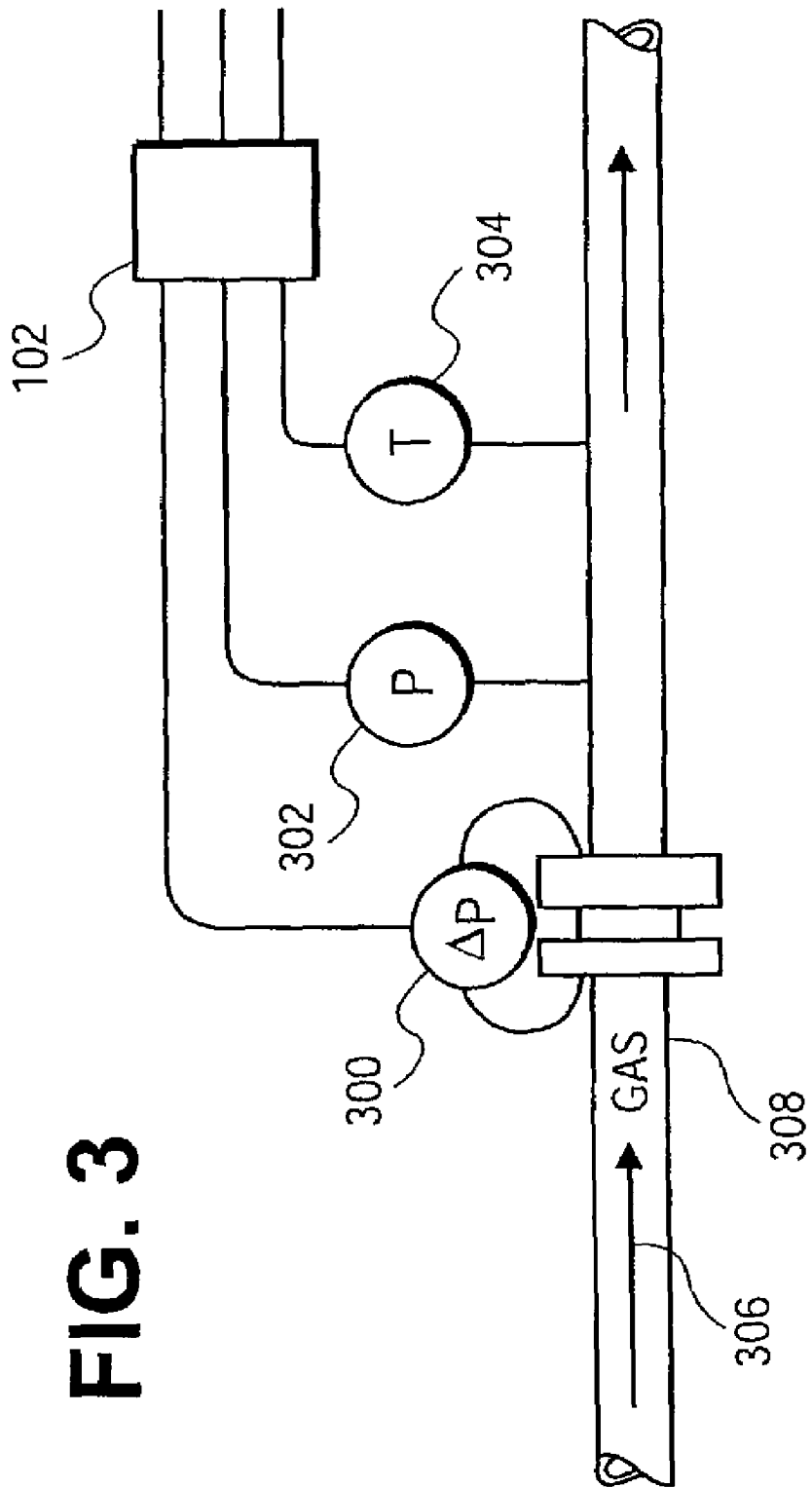
FIG. 3 shows a sensor interface module to measure flow rate in a pipeline.

A further alternative use of the sensor interface modules is illustrated in FIG. 3. One of the sensor interface modules 102 can be connected to external hardware sensor 204 (not shown) which includes multiple sensing units as a part of the external hardware sensor. An example of these types of sensors are shown as a flow sensor 300, pressure sensor 302, and temperature sensor 304 which gather information about the flow of gas or other liquids 306 through a pipeline 308. Information may be alternatively obtained from a flow computer which is connected to an orifice meter or a turbine meter. Flow computers and meters, such as turbine meters and orifice meters, are well known. Flow computers may be connected to sensor interface modules to allow the data from the flow computer to be delivered to a data collection module. Alternatively, if the flow computer has the appropriate capabilities, the flow computer can be programmed to directly communicate with the data collection module and, thus, bypass the sensor interface module.

Another alternate use for the sensor interface modules (not shown) would be for the monitoring of digital electric meters, external corrosion control monitoring systems, automated tank level control systems, and other types of systems. Additionally, devices which have output capabilities may be capable of being directly connected to the sensor interface modules, where the device itself becomes the external hardware sensor. Another possibility is that the device may have communication capabilities that allow for a direct connection to the data collection module without requiring the use of a sensor interface module.

Each of the sensor interface modules 102 include an external hardware sensor 204 which is capable of monitoring the desired device. Note that the word "external", as used in describing the external hardware sensor, means external to the standard design of the sensor interface module's data acquisition and transmission capabilities. This is due to the fact that the external hardware sensors will be different for individual applications. Thus, external means external only to the common circuitry for data gathering and transmission, and not necessarily physically external to the enclosure containing the sensor interface module 102.

Figure 4:
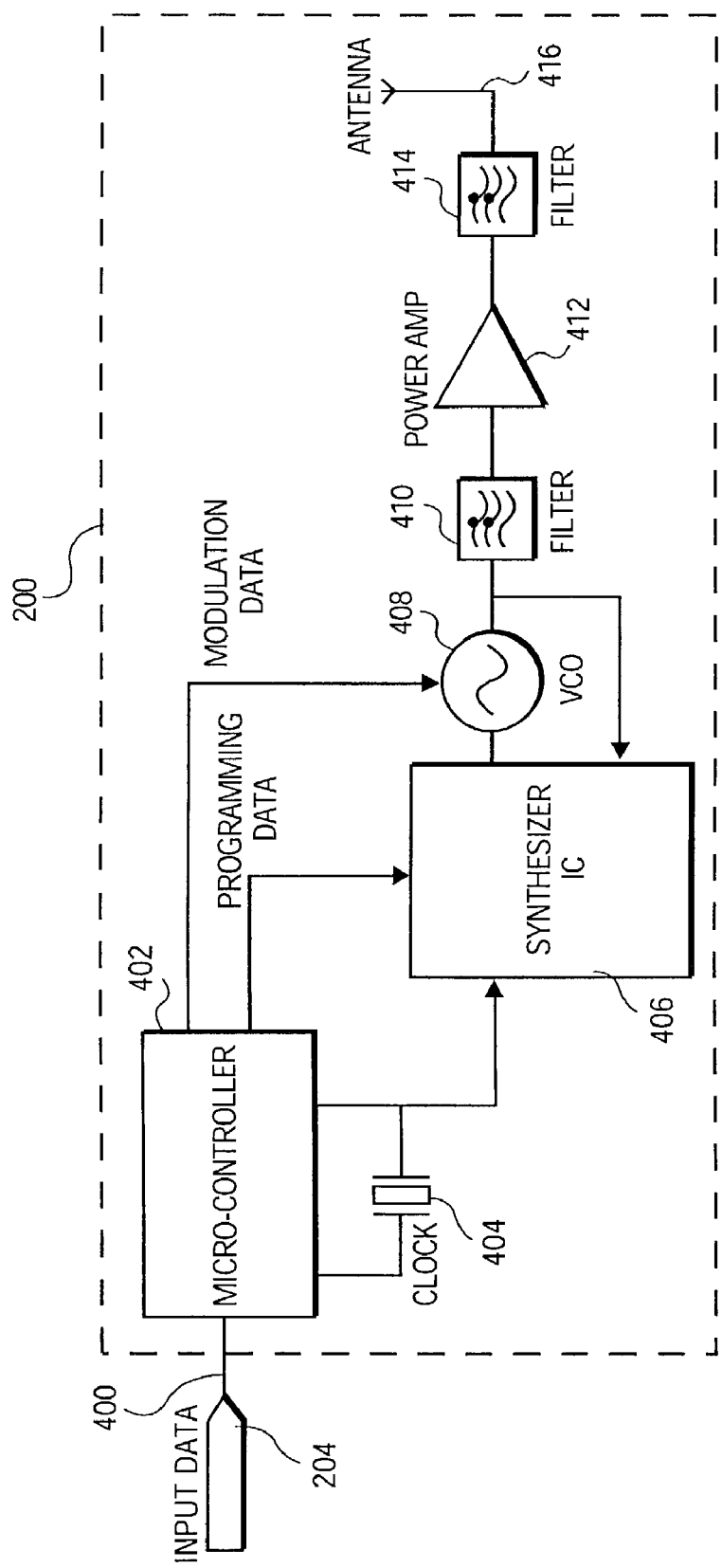
FIG. 4 shows a schematic of an exemplary sensor interface module.

FIG. 4 is a block diagram of a sensor interface module 102 which consists of a sensor interface main body 200 (shown by dashed lines) with an internal circuit board, and a connection 400 to an external hardware sensor 204 to receive input data, as described above.

The sensor interface module 102 includes a programmable processor micro-controller 402 with associated code which allows for flexibility in setting user definable parameters and to accommodate upgrades to the product. The basic program function of the programmable processor micro-controller 402 will be explained later. The micro-controller 402 is connected to a clock 404, which may operate in the 4 Mhz range, which provides a reference clock to a synthesizer 406. The micro-controller 402 also has a path to provide programming data to the synthesizer 406. The synthesizer 406 provides voltage to a voltage controller oscillator (VCO) 408. The VCO 408 also receives modulation data from the micro-controller 402. In the preferred embodiment, the VCO is designed to operate in the range of 902 to 928 Mhz. Output from the VCO 408 passes through a VCO filter 410 and feeds a power amplifier 412 which is passed through an amplifier filter 44. In the preferred embodiment, VCO filter 410 and amplifier filter 44 are designed to operate with an Fc of 950 Mhz. The output of amplifier filter 414 goes to an antenna 416 which operates in the range of 902 to 928 Mhz in the preferred embodiment.

The unit may be powered by a long life lithium battery (not shown), for a multiple year design life and/or powered from an external source. The battery power supply allows for the connection of sensor interface modules as monitoring devices which will be unaffected by long term power disruptions, power surges, or other system variations. This long life battery also allows the system to monitor areas or items which do not have power systems readily available.

Referring back to FIG. 1, the sensor interface module 102 receives information from external hardware sensors attached to the device or devices being monitored. This information is interpreted by the module's processing system which processes the information and then transmits the processed information to a data collection module.

For gas meter reading applications, the system detects pulses from the external hardware sensor, refines the sensor external hardware sensor signal to eliminate any erroneous signals, accumulates the signal pulses from the external hardware sensor, interprets the information according to its internal programming, the processed information is stored into memory for future updates, and the information is transmitted to the data collection module.

The external hardware sensor signals are recorded as a cumulative value for metering systems. This cumulative value is transmitted to the data collection modules. A cumulative count ensures that any gaps in information transmission will only have a temporary effect on the overall system's information flow. If a transmission is missed, then the cumulative information from before the missed transmission and a later received transmission will allow the host module to "recover" the missed transmission information by interpolation.

The sensor interface module is programmed to set the unique identifier for the device and the frequency that it transmits to the data collection module.

The sensor interface module 102 may be programmed by a programming computer (not shown) having a program implemented on a hand held processing or personal computer type of device. At the time of programming the sensor interface module, the programming information is either immediately transferred to the host module for permanent storage, or is maintained in the programming device for a future upload to the host module. The sensor interface module has a programmable 32 bit address with the ability to maintain a maximum pulse count of 65535 from an external input.

In a preferred embodiment, the sensor interface module is designed to transmit via a spread spectrum radio operating on a 30 kHz bandwidth. The radio uses a hopping algorithm and has a maximum transmission time of approximately 50 msec on any one frequency channel. The transmission capabilities are approximately 3 miles in a line of sight transmission. However, the useable transmission distance among buildings, trees, and other disruptions is closer to 2000 feet. In the preferred embodiment, the sensor interface module is located at a maximum distance of 600 feet to 2000 feet from a data collection module.

The data collection module boxes are weatherproof enclosures that house data collection electronics. RF input signals in the range of 902 Mhz to 928 Mhz are received through the horizontally polarized antenna and routed to the receiver module. The receiver module hops the 25 pre-set frequencies looking for a RF signal modulated with a particular format. Once a valid signal is identified, the receiver stops hopping and decodes the entire data packet which passes along to CPU module for collection and evaluation.

Returning to a consideration of FIG. 1, the data collection module 110 provides the information transmission connection between the sensor interface module 102 and the network connection 116 to the host module 122. The data collection module 110 is a local, intelligent data concentrator residing at or near the location of the sensor interface modules 102. The data collection module 110 acts as the focal point of all the information which is collected from the sensor interface modules 102 within a monitored area, such as a customer's premise, and transmits this information to the host module 122 over standard communication systems 118.

In general, the data collection module works by following a simple routine. While in receive mode, the 900 Mhz Transceiver will continuously scan the frequency band of 902 and 928 Mhz searching for a RF signal. If a RF signal is detected, the transceiver will lock on to this signal, demodulate it, Manchester decode the data, and send this data to an RS-232 port. If a RF signal is not detected, this unit will collect data packets via an RS-232 port, Manchester encode the data, and transmit this data on 1 of 50 different frequency channels ranging from 902 to 928 Mhz. This transmission will use FSK (Frequency Shift Keying) modulation and will transmit for approximately 180 msec. After a packet of data has been transmitted, the transmitter will return to receive mode and start scanning again for an RF signal. The unit will also start collecting another transmit data packet. The above process will then be repeated (at a different frequency) once a complete data packet has been collected. All 50 transmit frequency channels will be used before any given frequency is repeated.

Two-Way Telemetry

As the name implies, a two-way telemetry interface module (TIM) may send and receive messages. A two-way TIM may receive command messages requesting data, for example, allowing a Sensor Interface Module (SIM) to transmit data on a polled basis. A two-way TIM may also receive command messages, for example, to update a control output signal. A two-way TIM that generates a control output signal may be referred to as a telemetry output module (TOM). A two-way TIM that receives one or more sensor signals as inputs and generates one or more control outputs may be referred to as a telemetry control module (TCM). For one embodiment, a two-way TIM may serve as a data interface module (DIM) gathering data from, or communicating to a plurality of two-way TIMs of various types. A DIM may perform similar functions to the data collection module (DCM) previously described.

Figure 5:
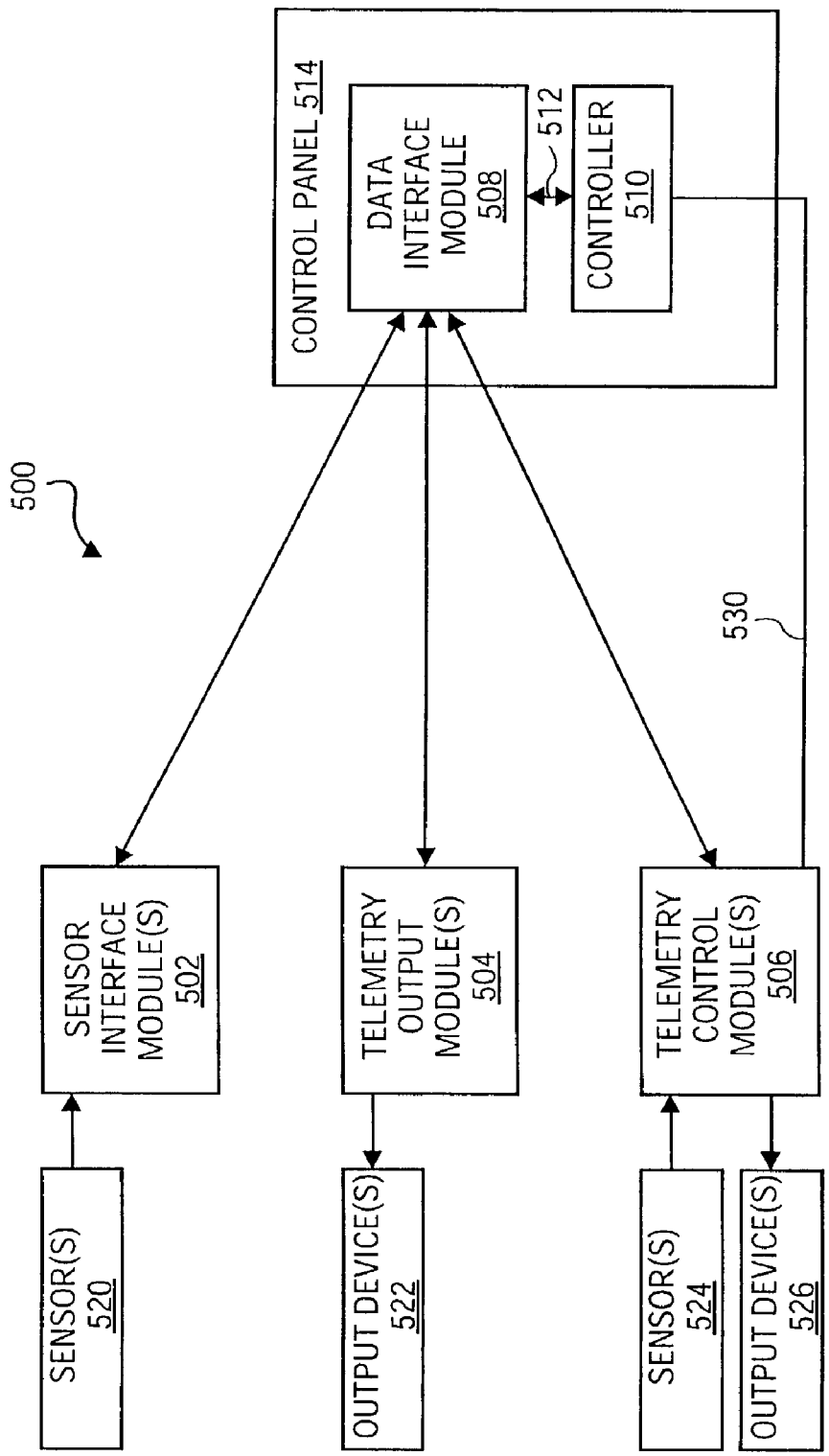
FIG. 5 shows an exemplary two-way telemetry control system.

FIG. 5 illustrates an exemplary two-way telemetry system 500. As illustrated, system 500 may comprise a plurality of two-way telemetry interface modules (TIMs), such as SiMs 502, TOMs 504, and TCMs 506, each coupled with a data interface module (DIM) 508 through a wireless connection. SIMs 502 may monitor input signals from one or more sensors 520. Sensors 520 may include digital (on/off) switches and/or analog sensors, such as 4–20 milli-ampere switches and voltage sensors. Telemetry output modules (TOMs) 504 may be coupled with one or more output devices 522. Examples of output devices include control valves, solenoids, and pumps. Types of control valves may include fuel valves, shut-off valves, suction valves, and discharge valves. Types of pumps may include electrically submersible pumps and irrigation pumps. TCMs 506 may be coupled with one or more sensors 524 and one or more output devices 526. Sensor 524 and output devices 526 may be any combination of the types of sensors and output devices previously described.

For one embodiment, a controller 510 may communicate with DIM 508 through a local control bus 512. DIM 508 and a controller 510 may be part of a control panel 514, which may be located at an industrial site. The local control bus may be compatible with a standard industrial protocol, such as Schneider Electric's Modbus® protocol or the Society of Automotive Engineers' (SAE) J1939 protocol. Therefore, a controller with a compatible bus interface may communicate with a plurality of TIMs through a DIM. For example, data from sensors connected with SIMs may be gathered by a DIM, and the data may be mapped to registers that can be read by the controller, while control outputs of TOMs may be mapped to registers that can be written to by the controller, allowing the controller to control an output device coupled with the TOM. Therefore, TIMs may provide a wireless interface to sensors and output devices, allowing greater flexibility in placement of the control panel.

For one embodiment, TIMs may also have a wired connection, such as wired connection 730, in addition to a wireless connection with a DIM. A wired connection provide for redundancy which may allow greater security of communications between TIMs. For example, if a wireless connection between a TIM and a DIM is lost, the wired connection may allow the TIM to continue communications with the DIM. Alternatively, if the wired connection is lost, the wireless connection may allow the TIM to continue communications with the DIM. Redundancy may be especially desirable for critical monitored parameters. To reduce wiring, the wired connection may be a bused connection, such as previously described Modbus®, J1939, or any suitable bused connection.

Figure 6:
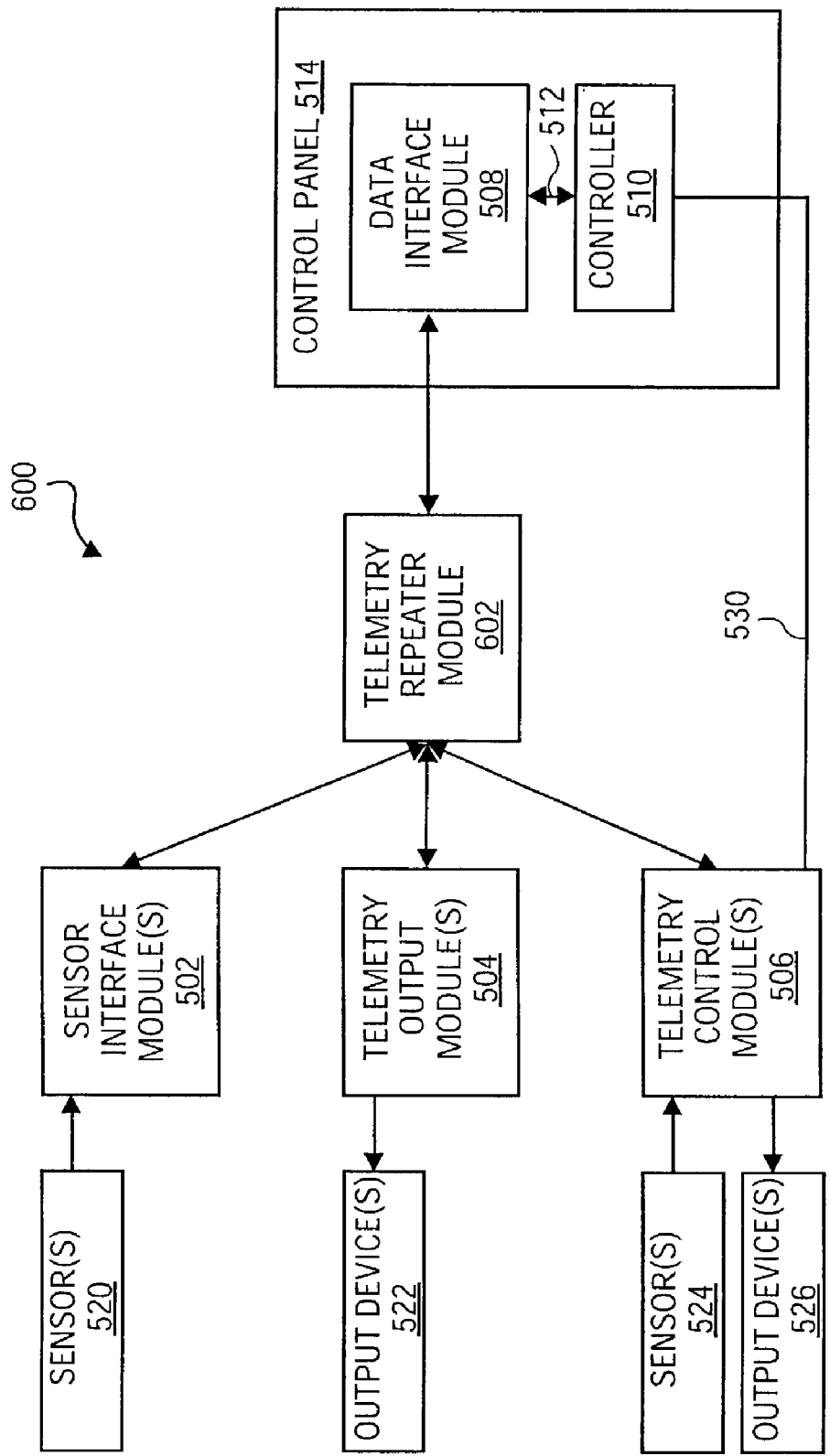
FIG. 6 shows an exemplary two-way telemetry control system with a telemetry repeater module (TRM).

As illustrated in FIG. 6, for one embodiment, a two-way TIM may function as a telemetry repeater module (TRM) 602, effectively extending the allowable distance between TIMs. A TRM may, for example, receive a command message from a DIM and re-transmit the command message to a TIM. Similarly, the TRM may receive a reply message from the TIM and re-transmit the reply message to the DIM. A TRM may allow a group of TIMs to be placed a greater distance from a control panel than is normally allowed, which may facilitate placement of the control panel.

Two-Way Telemetry Interface Module (TIM)

Figure 7:
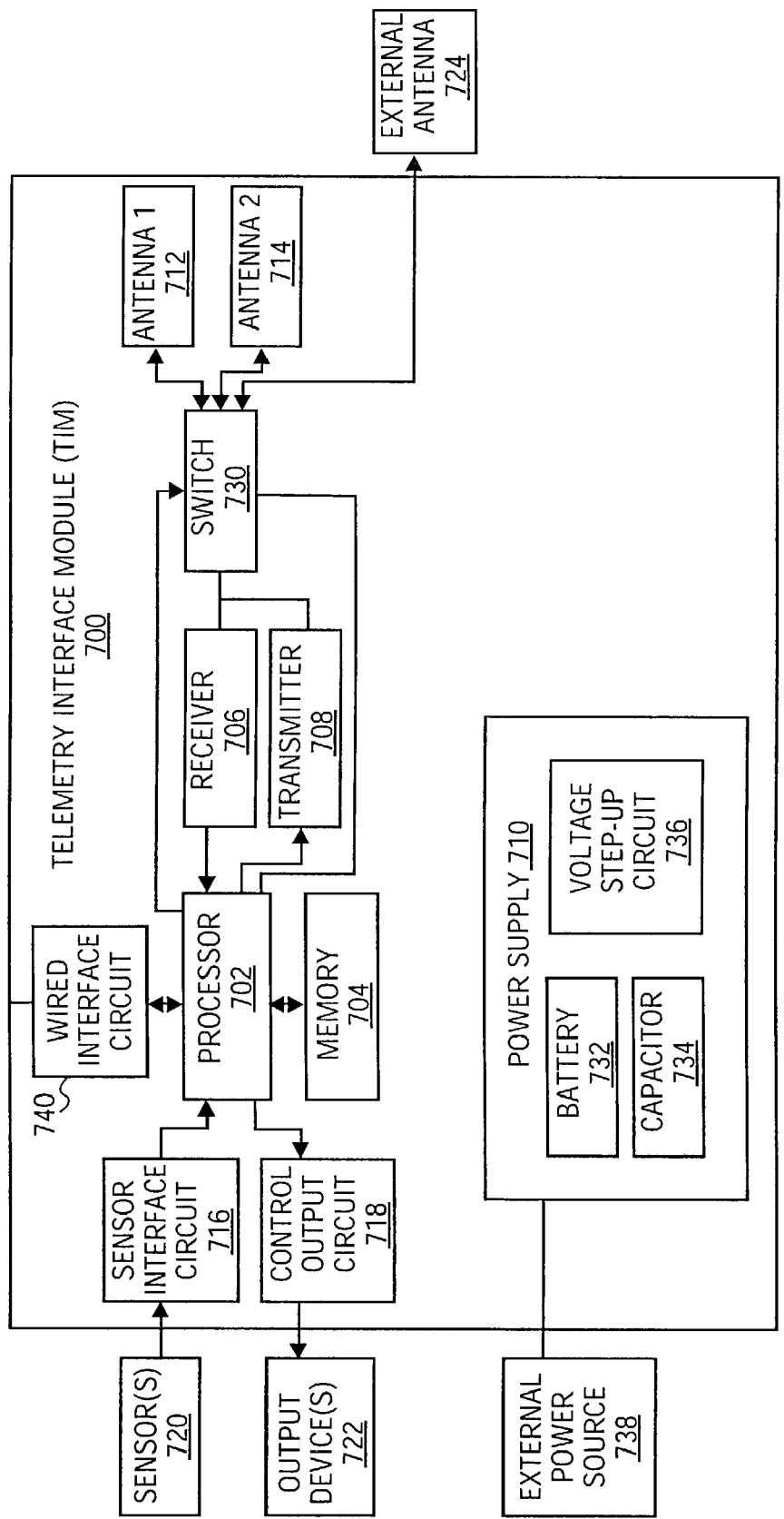
FIG. 7 shows a block diagram of one embodiment of a telemetry interface module (TIM).

FIG. 7 illustrates a block diagram of one embodiment of a two-way TIM 700. As illustrated, the basic components of a TIM may comprise a processor 702, memory 704, receiver 706, transmitter 708, and a power supply 710. The processor may be any suitable processor. For one embodiment, the processor and memory may be integrated in a microcontroller device. Examples of microcontroller devices include the PICmicro® series of microcontrollers from Microchip Technology Incorporated and the AT series of microcontrollers from Atmel Corporation. The memory may have stored therein a set of instructions to implement two-way telemetry according to the present invention.

The transmitter and receiver may each comprise suitable circuitry. For one embodiment, the transmitter and receiver operate in a frequency range from 902 Mhz to 928 Mhz. The transmitter and receiver may be integrated on a common integrated circuit device. A receiver may output a received signal strength indicator (RSSI) signal which may be read by the processor. For one embodiment, a transmission power level of the transmitter may be adjustable, for example, by the controller. For example, the transmission power level may be kept at a minimum allowable level, which may lower power consumption and extend battery life.

As illustrated, a TIM may comprise one or more internal antennae, such as antennae 712 and 714, as well as a connection for an external antenna 724. For one embodiment, the antennae may operate in a frequency range from 902 Mhz to 928 Mhz. The antennae may be coupled with a switch 730. The processor may control the switch to select one of the antennae for transmission and reception, for example, in an effort to optimize signal strength for transmissions to a receiving TIM, such as a DIM. More than two internal antennae may be provided. For one embodiment, internal antennae are embedded into a PC board. Embedding the antennae into the PC board may provide cost savings over an external antenna. For another embodiment, internal antennae may be mounted on the PC board.

As previously, described, the TIM may communicate to a DIM through a wired connection. Therefore, the TIM may also have a wired interface circuit 730. The wired interface circuit may comprise any suitable interface circuitry to accommodate a suitable wired connection with another TIM. For one embodiment, the wired connections of more then one TIM may be bused together to facilitate wiring.

As illustrated, power supply 710 may comprise a battery 732, a capacitor 734, and a step-up voltage circuit 736. The battery may be any suitable battery, such as a long life lithium battery. For one embodiment, the capacitor may be charged to provide power for transmissions, rather than the battery, protecting the battery from high current demands which may extend the life of the battery. The capacitor may be any suitable capacitor, such as a SuperCapacitor available from Tokin Corporation. For one embodiment, the step-up voltage circuit may monitor the voltage level of the battery, and step-up the voltage by converting the voltage to a higher voltage, allowing the TIM to operate for a limited time at a lower battery voltage than is normally required. As illustrated, for one embodiment, the power supply may accept power from an external power source 738. Therefore, the power supply may comprise suitable circuitry to switch between the external power source and the battery to prevent current draw from the battery when the external power source is connected.

A TIM may comprise additional circuitry depending on desired functionality. For example, a sensor interface module (SIM) may comprise a sensor interface circuit 716 to receive signals from one or more sensors 720. A telemetry output module (TOM) may comprise a control output circuit 718 to couple with one or more output devices 722. A telemetry control module (TCM) may comprise both a sensor interface circuit and a control output circuit to receive one or more sensor signals and couple with one or more output devices.

Figure 8:
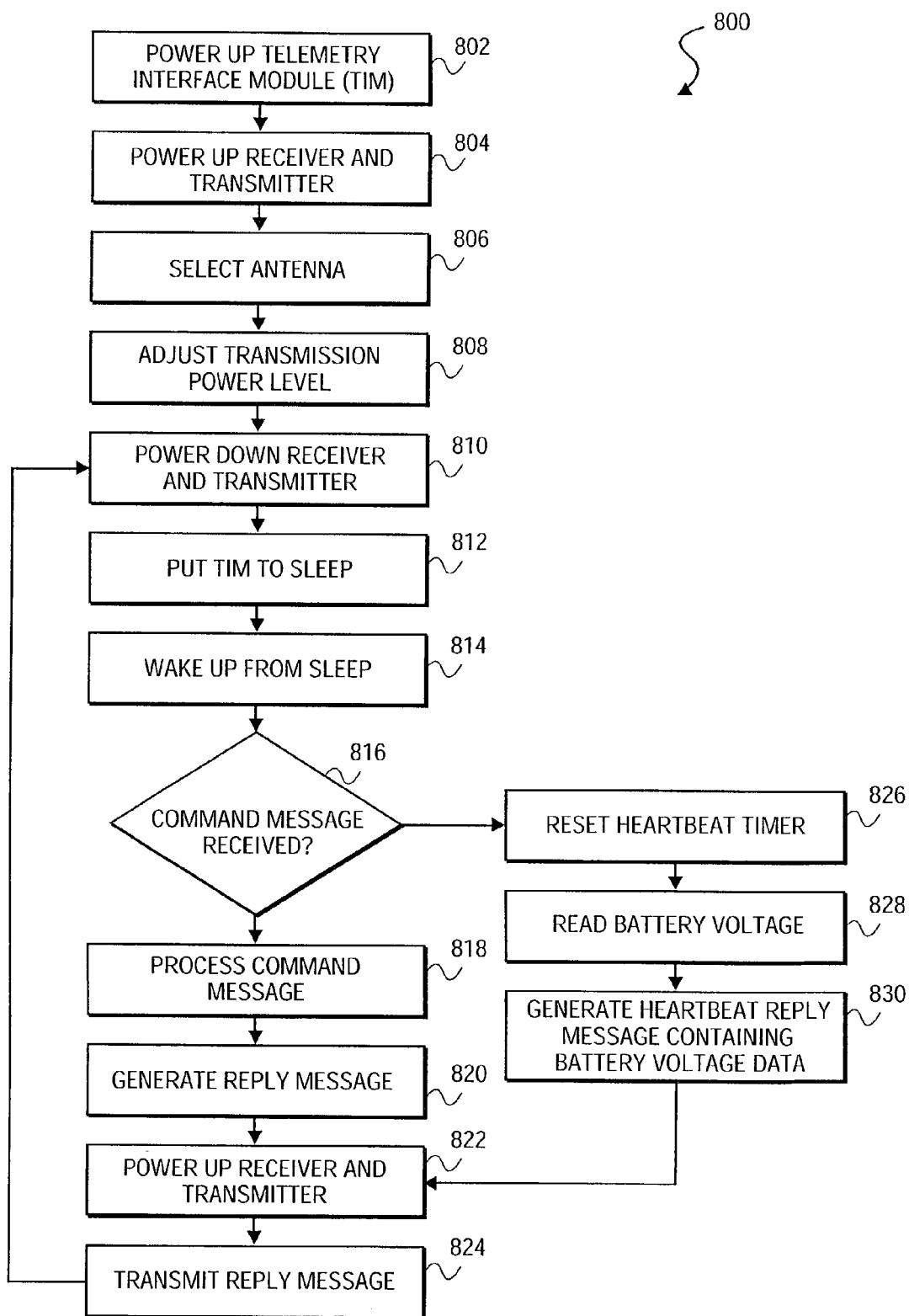
FIG. 8 shows a flow diagram of the operation of one embodiment of a telemetry interface module (TIM).

The operation of one embodiment of a two-way TIM is illustrated in flow diagram 800 of FIG. 8. In step 802, the TIM is powered-up, for example, by applying external power to the TIM, or installing a battery. For step 804, the receiver and transmitter are powered up. For step 806, an antenna is selected for reception and transmission. For step 808, a transmission power level for the transmitter is adjusted. Methods for selecting an antenna and adjusting the transmission power level will be described in greater detail below. For step 810, the receiver and transmitter are powered down. For one embodiment, powering down the receiver and transmitter may comprise placing the receiver and transmitter in a low power state which may be exited upon detection of a predetermined message.

For step 812, the TIM is put to sleep. For one embodiment, putting the TIM to sleep may comprise, for example, placing a processor in a low power state. The TIM may wake up from sleep by exiting the low power state of the processor in response to a variety of different events. For example, prior to placing the processor in a low-power state, a number of interrupts may be enabled to cause the processor to exit the low-power state upon the occurrence of any of the interrupt conditions. For example, the processor may generate an interrupt if a monitored sensor changes state or if a message is detected by the receiver.

An interrupt may also be generated upon the expiration of a timer, which may be internal or external to the processor. For one embodiment, such a timer may be used as a heartbeat timer to periodically wake-up the processor in order to transmit a reassuring heartbeat message to a receiving device, for example, a DIM. For one embodiment, the heartbeat message may contain battery voltage data.

For step 814, the TIM wakes up from sleep. For step 816, the TIM checks to see if a command message is received. If a command message is received, the command message is processed for step 818 and a reply message is generated for step 820. For example, if the command message is a request to read data from a sensor monitored by a SIM, the SIM may read the sensor signal and generate a reply message containing sensor data. Alternatively, if the command message is a write command to a TOM, the TOM may update a control output and generate a reply message to acknowledge the command. The reply message may also include an indication that the command was successfully processed.

For step 822, the receiver and transmitter are powered up, and for step 824, the reply message is transmitted. After the reply message is transmitted, in an effort to conserve battery power, the receiver and transmitter may be powered down again, for block 810, and the TIM may be put back to sleep for block 812. For one embodiment, the TIM may remain awake for a predetermined amount of time prior to going back to sleep.

If a command message is not received for block 816, the TIM may have been awakened by the expiration of the heartbeat timer. Therefore, for step 826, the heartbeat timer is reset. For step 828 the battery voltage is read, and for step 830, the TIM generates a heartbeat reply message containing the battery voltage data. For step 822 the receiver and transmitter are powered up and the reply message is transmitted for step 824, as previously described.

Transmission Power Adjustment

For one embodiment, transmission power level of a two-way TIM may be adjusted. Adjusting the transmission power level may offer a number of advantages. For example, the transmission power level may be limited to reduce power consumption for transmissions in an effort to extend battery life. For one embodiment, a higher transmission power level may be used when a TIM is connected with an external power source than when the TIM is powered from a battery only. As another example, FCC licenses may be obtained for different products specifying different maximum transmission power levels. By adjusting the transmission power level of the transmitter, the same transmitter circuitry may be used in both products without the cost of redesigning the transmitter circuitry.

Figure 9:
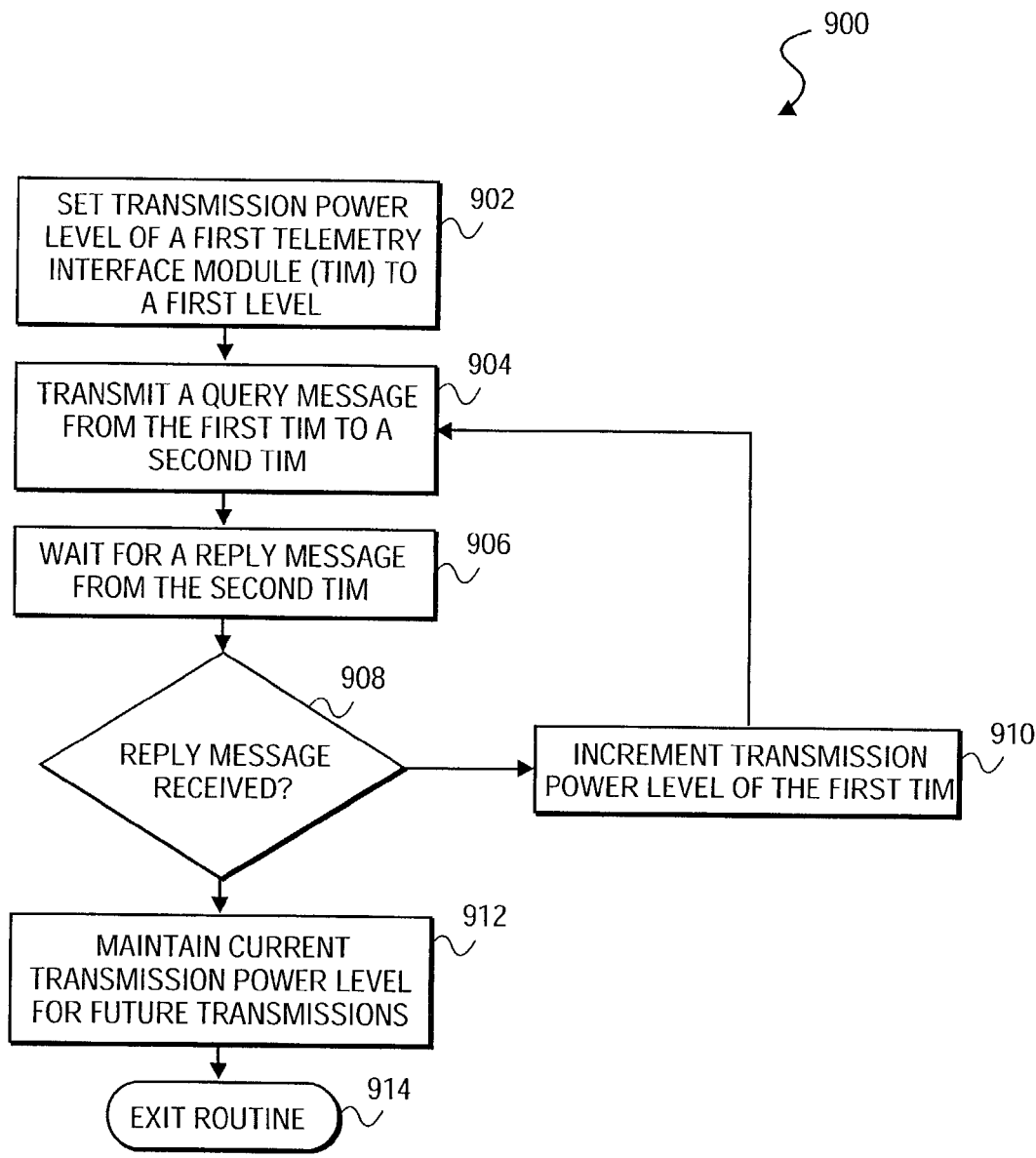
FIG. 9 shows a flow diagram of a routine to adjust transmission power according to one embodiment of the present invention.

FIG. 9 illustrates, for one embodiment, a routine 900 to adjust a transmission power level of a TIM. The method requires at least two TIMs. For step 902, the transmission power level of a first TIM is set to a first power level. For example, the first power level may be a minimum power level. For one embodiment, a transmission power level may be adjusted through a digital interface provided in the transmitter. For another embodiment, the transmission power level may be adjusted by adjusting a voltage supplied to the transmitter.

For step 904, a query message is transmitted from the first TIM to a second TIM. The query message may be any command that prompts the second TIM to respond with a reply message. For step 906, the first TIM waits for a reply message from the second TIM. For one embodiment, the first TIM may wait a predetermined amount of time for the reply message before a timeout occurs.

If a reply message is not received, for step 908, the transmission power level may not have been strong enough for the transmitted query message to reach the second TIM. Therefore, the transmission power level of the first TIM is incremented for step 910, the first TIM again transmits a query message for step 904, and waits for a reply message for step 906.

If the first TIM receives a reply message from the second TIM, for step 908, the transmission power level for the transmitted query message was sufficient to reach the second TIM. Therefore, for step 912, the transmission power level is maintained for future transmissions, and the routine is exited for step 914. For one embodiment, to provide a safety margin, the transmission power level may be incremented further after a reply message is received. According to the method described above, a transmission power level may initially be set to a minimum level. Alternatively, the transmission power level may be initially set to a higher level, decremented until a reply message is not received from the second TIM, then adjusted back to a higher level.

Receive Signal Strength Indicator (RSSI)

As previously described, a receiver may provide a received signal strength indicator (RSSI) signal, or a similar signal to indicate the strength of a received signal. For one embodiment, a receiver may provide a digital value of an RSSI signal. An RSSI signal may be utilized to perform various functions, such as transmission power level adjustment and antenna selection. To facilitate description of the invention, any similar signal indicative of the strength of a received signal will also be referred to as an RSSI signal.

According to one embodiment, a two-way TIM may measure an RSSI signal for a message, as received by another two-way TIM. For example, a first TIM may transmit a query message to a second TIM requesting RSSI data for the query message, as received by the second TIM. The second TIM receiving the query message may read RSSI data for the query message, as received, generate a reply message containing the RSSI data, and transmit the reply message containing the RSSI data to the first TIM. Therefore, the first TIM may receive data regarding the strength of its transmitted signals, as received by other TIMs.

Figure 10:
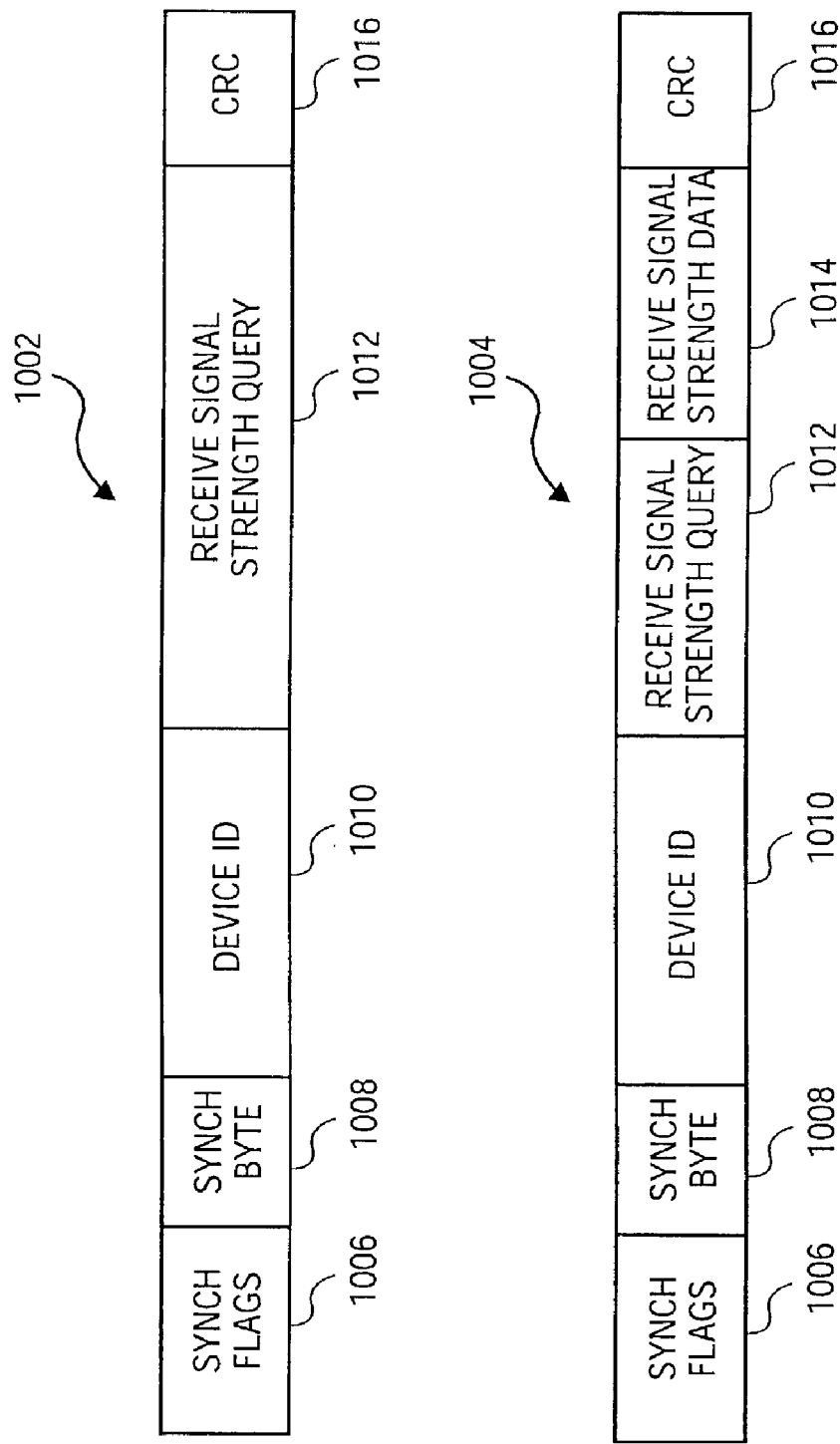
FIG. 10 shows exemplary receive signal strength query and reply messages.

FIG. 10 illustrates an exemplary RSSI query message 1002 and an exemplary RSSI reply message 1004 which may each have fields 1006 through 1016. Fields 1006 and 1008 may contain synchronization data, for example, to allow a receiving TIM to synchronize with the transmission. Field 1010 may contain a device identification (ID) which may be, for example, a 32-bit number that uniquely identifies a TIM. Field 1012 may contain a command code, for example, identifying the message as an RSSI query. Field 1016 may contain an error correction code, for example, a cyclic redundancy check (CRC) value calculated for the remainder of the message. Reply message 1004 may also have an additional field 1014 that contains the RSSI data for the query message as received.

Figure 11:
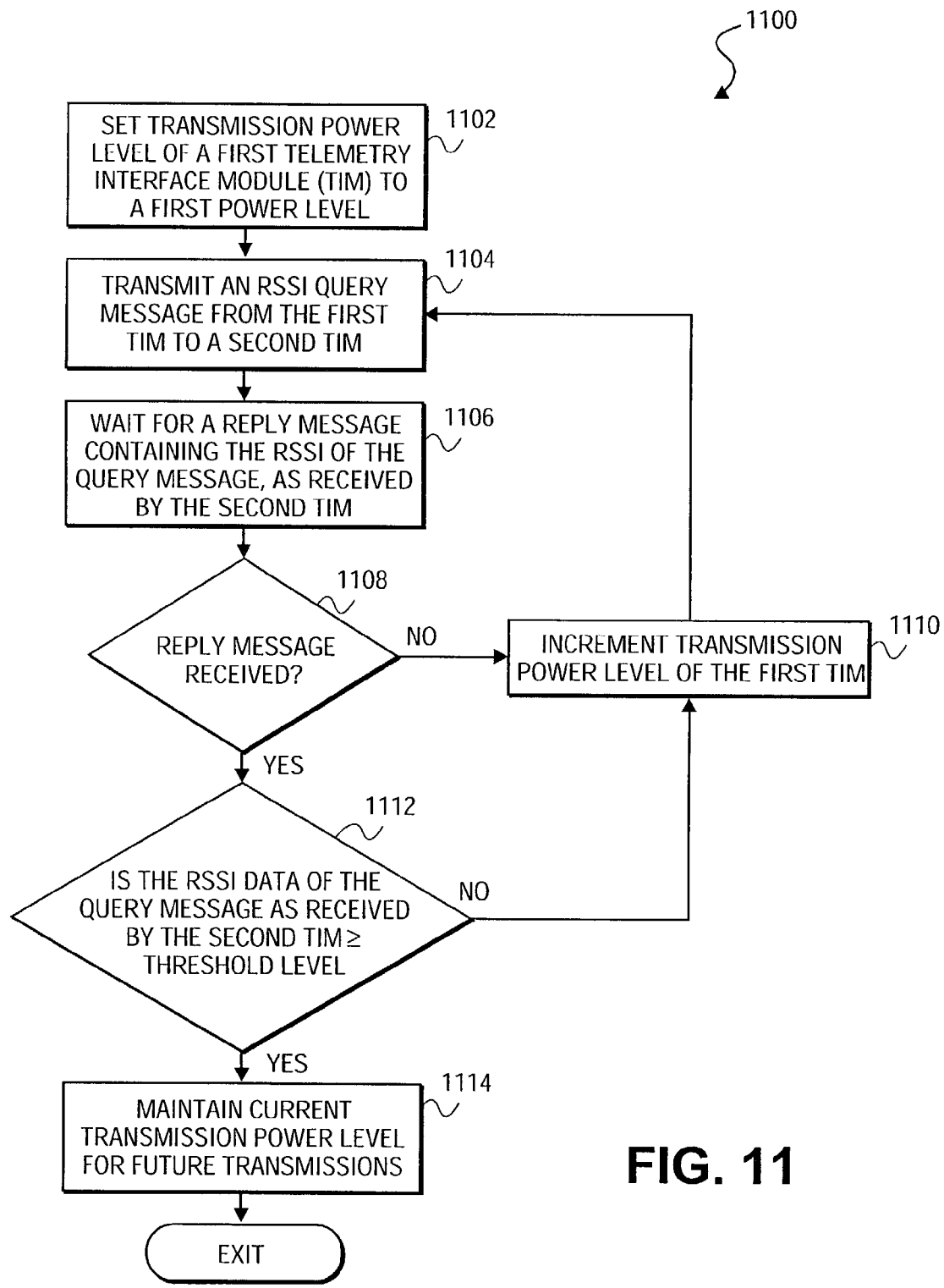
FIG. 11 shows a flow diagram of another routine to adjust transmission power according to one embodiment of the present invention.

FIG. 11 illustrates a routine 1100 to adjust the transmission power level of a TIM that utilizes an RSSI query message. For step 1102, the transmission power level of a first TIM is set to a first power level. For step 1104, the first TIM transmits an RSSI query message to a second TIM. For step 1106, the first TIM waits to receive a reply message from the second TIM. As previously described, if no reply message is received, for block 1108, the transmission power level may have been insufficient for the query message to reach the second TIM. Therefore, the transmission power level may be incremented for step 1110 prior to sending another RSSI query message for step 1104.

If a reply message is received for step 1108, the transmission power level was at least sufficient for the query message to reach the second TIM. The reply message should contain RSSI data for the query message as received by the second TIM. For one embodiment, the first TIM compares the RSSI data to a threshold value for step 1112. The threshold value may be determined, for example, to ensure a minimum strength for signals received by the second TIM.

If the RSSI data is less than the threshold level, the transmission power level may be marginal. Therefore, the transmission power level may be incremented for step 1110 prior to sending another RSSI query message for step 1104.

If the RSSI data exceeds the threshold level, the transmission power level may be adequate to ensure transmissions from the first TIM will reach the second TIM. Therefore, for step 1114, the transmission power level is maintained for future transmissions, and the routine is exited for step 1116. For one embodiment, a transmission power level adjustment routine may be performed periodically to account for changes in the telemetry environment, such as weather and the addition or removal of physical objects, that may affect transmissions and reception.

Automated Antenna Selection

Figure 12:
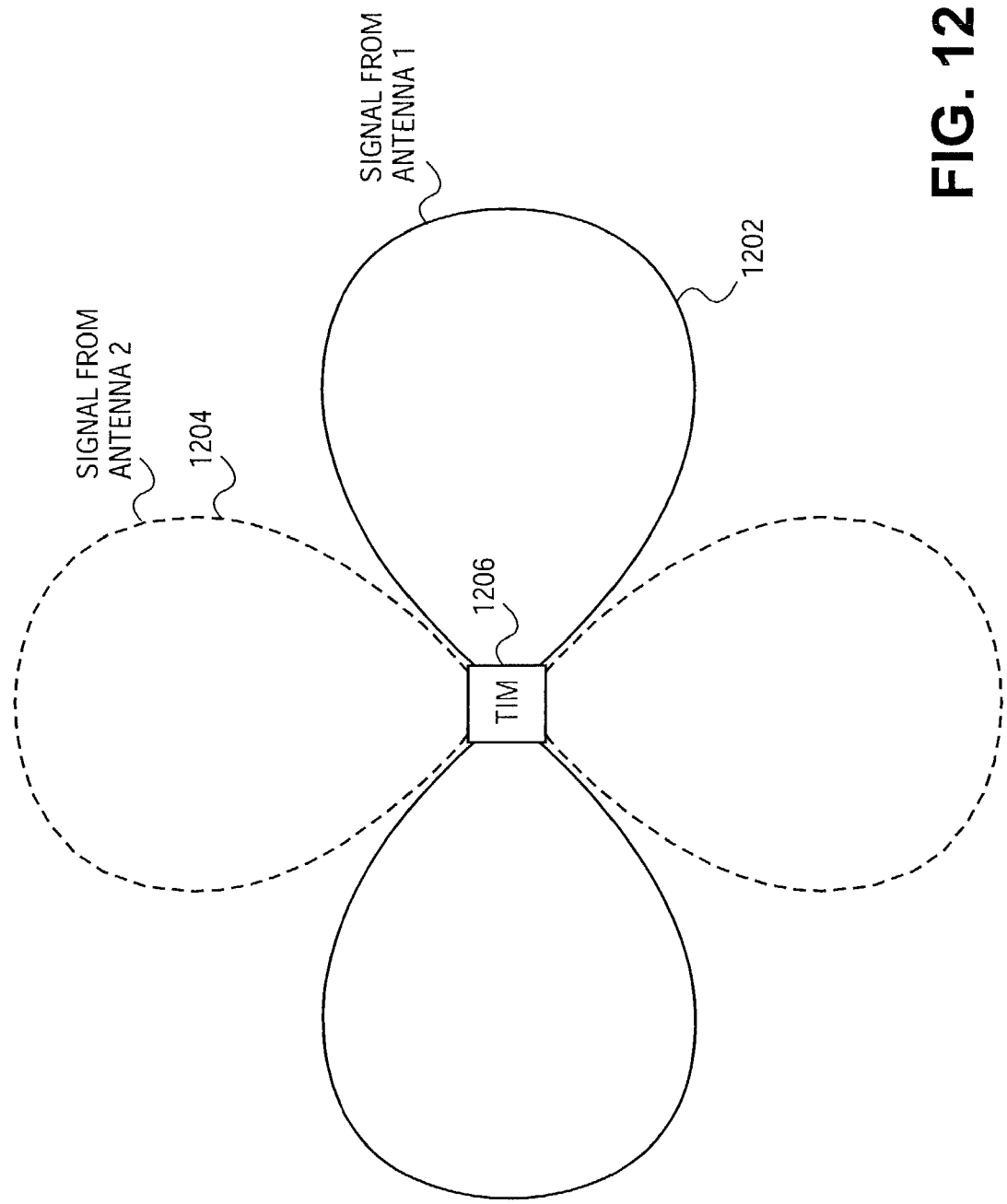
FIG. 12 shows a pair of exemplary signal patterns transmitted from a pair of antennae.

As previously described, in an effort to maximize transmission and/or reception coverage area, a TIM may utilize more than one antenna. For another embodiment, an external antenna may be connected as well as one or more internal antennae. FIG. 12 illustrates exemplary transmitted signal patterns 1202 and 1204 transmitted from two generally orthogonal antennae of TIM 1206. For one embodiment, generally orthogonal antennae may be embedded into a PC board of the TIM. As illustrated, using two generally orthogonal antennae may result in approximately double the coverage area. However, the signal patterns may be directional and, therefore, may be generally exclusive. For example, a receiving TIM located in the coverage area of signal pattern 1202 may receive signals generated from the first antenna, but may not receive signals transmitted from the second antenna. Therefore, it may be desirable to select between the antennae to create an optimal coverage area.

Figure 13:
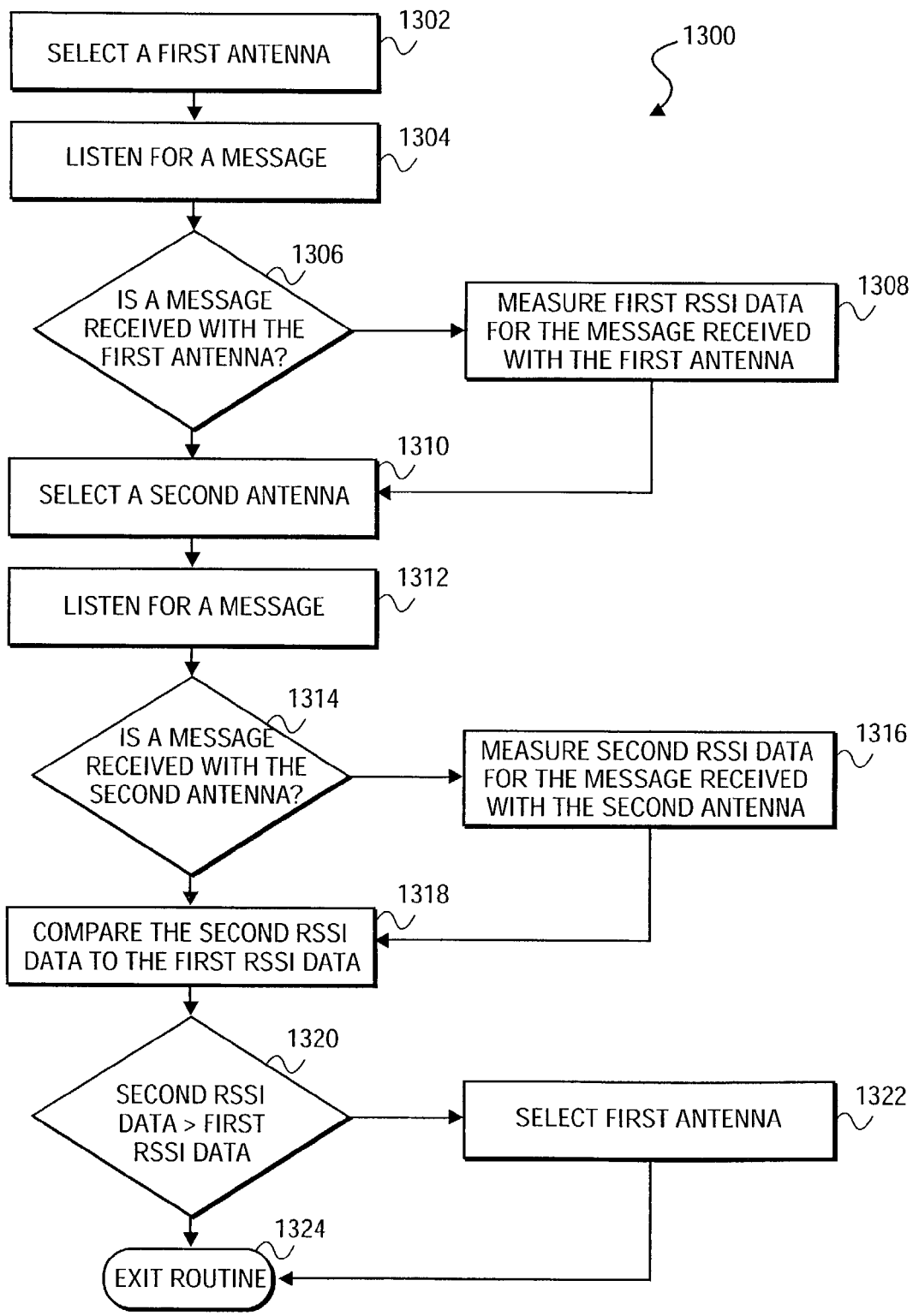
FIG. 13 shows a flow diagram of a routine to select an antenna from a plurality of antennae according to one embodiment of the present invention.

FIG. 13 illustrates a routine 1300 to select between more than one antennae. For block 1302 the TIM selects a first antenna. As previously described, for one embodiment, a processor may control a switch to select from one or more antennae. For block 1304, the TIM listens for a message. For one embodiment, the TIM may send a query message (not shown) in an attempt to elicit a response. For another embodiment, the TIM may simply listen, for example, for command messages from a data interface module (DIM).

For block 1306, if the TIM does not receive (or "hear") a message, it selects a second antenna for block 1310. If the TIM does receive a message, it measures first RSSI data for the message for block 1308 before selecting a second antenna for block 1310. An RSSI data value may be set to zero at the first TIM if no reply message is received.

For block 1312, the TIM again listens for a message. For block 1314, if the TIM hears a message, it measures second RSSI data for the message for block 1316. For block 1318, the second RSSI is compared to the first RSSI. For block 1320, if the second RSSI is greater than the first RSSI, the routine is exited for block 1324, with the second antenna selected. If the second RSSI is less than the first RSSI, the first antenna is selected for block 1322 prior to exiting the routine for block 1324. For one embodiment, first and/or second RSSI data may be compared against a threshold value.

According to the routine illustrated in FIG. 13, the antenna that receives the message with the highest RSSI (signal strength) is selected. In other words, the routine may be used to select an antenna that optimizes reception. For another embodiment, the RSSI of a TIM receiving a query message may be used to determine which antenna to select. In other words, the transmission signal strength from the antenna, as received by another TIM, may be the deciding factor.

Figure 14:
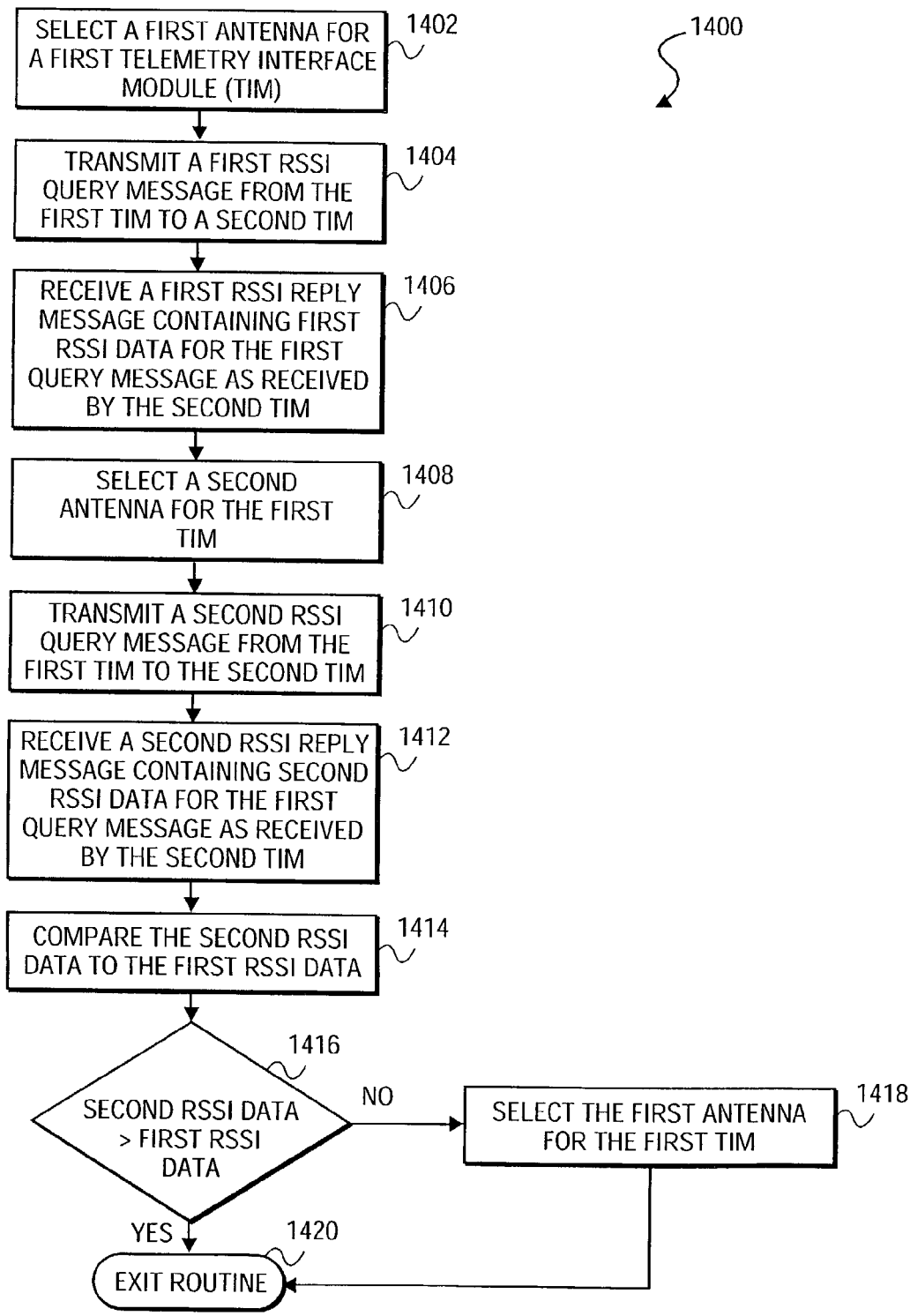
FIG. 14 shows a flow diagram of another routine to select an antenna from a plurality of antennae according to one embodiment of the present invention.

FIG. 14 illustrates a routine 1400 to select an antenna for a first TIM by transmitting RSSI query messages to a second TIM. For step 1402, a first antenna is selected for the first TIM. For step 1404, a first RSSI query message is transmitted from the first TIM to the second TIM. For step 1406, a first query message is received containing first RSSI data for the first query message, as received by the second TIM. An RSSI data value may be set to zero at the first TIM if no reply message is received.

For step 1408, a second antenna is selected for the first TIM. For step 1410, a second RSSI query message is transmitted from the first TIM to the second TIM. For step 1412, a second query message is received containing second RSSI data for the second query message, as received by the second TIM. For step 1414, the second RSSI data is compared to the first RSSI data. For step 1416, if the second RSSI data is greater than the first RSSI data, the routine is exited, for block 1420, with the second antenna selected. If the first RSSI data is greater than the second RSSI data, the first antenna is selected for block 1418 prior to exiting the routine.

Preferably, an antenna selection routine is performed after a TIM and a data interface module that will communicate with it are installed (i.e. their physical locations are determined). If the physical location of either a TIM or DIM is changed, an antenna selection routine should be performed again to select antenna for the new physical locations. Seasonal factors, such as the amount of leaves on a tree, may also affect antenna transmission and reception. Therefore, for one embodiment, an antenna selection routine may be performed periodically to adapt to such changes. While the exemplary routines above describe only two antennae, it should be understood that similar routines may be performed for more than two antennae by repeating one or more of the steps described.

It should also be noted that for different embodiments, the routines described above may be combined in various manners. For example, a transmission power level may be adjusted prior to selecting an antenna. Alternatively, an antenna may be selected prior to adjusting the transmission level. Further, any or all of the routines may be run sequentially, and the results of several routines may be used to determine an antenna selection and/or a transmission power level.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for two-way telemetry, comprising:
   transmitting a first query message from a first telemetry interface module to a second telemetry interface module;
   receiving a first reply message by the first telemetry interface module containing first received signal strength indicator (RSSI) data for the first query message, as received by the second telemetry interface module;

setting a transmission power level of the first telemetry interface module to a first power level prior to transmitting the first query message;
setting the transmission power level of the first telemetry interface module to a second power level; and
transmitting a second query message from the first telemetry interface module to the second telemetry interface module.

2. The method of claim 1, comprising:
receiving a second reply message by the first telemetry interface module containing second received signal strength indicator (RSSI) data for the second query message, as received by the second telemetry interface module; and
comparing the second received signal strength indicator (RSSI) data to the first received signal strength indicator (RSSI) data.

3. A method for two-way telemetry, comprising:
transmitting a first query message from a first telemetry interface module to a second telemetry interface module;
receiving a first reply message by the first telemetry interface module containing first received signal strength indicator (RSSI) data for the first query message, as received by the second telemetry interface module; and
selecting a first antenna, from a plurality of antennae at the first telemetry interface module, prior to transmitting the first query message.

4. The method of claim 3, comprising:
selecting a second antenna from the plurality of antennae after receiving the first reply message;
transmitting a second query message from the first telemetry interface module to the second telemetry interface module;
receiving a second reply message by the first telemetry interface module containing second received signal strength indicator (RSSI) data for the second query message, as received by the second telemetry interface module; and
comparing the second received signal strength indicator (RSSI) data to the first received signal strength indicator (RSSI) data.

5. A method for adjusting power in a telemetry interface module comprising:
transmitting a first query message at a first transmission power level to a second telemetry interface module;
listening for a reply message from the second telemetry interface module in response to the first query message;
transmitting a second query message at a second transmission power level to the second telemetry interface module; and
listening for a reply message from the second telemetry interface module in response to the second query message.

6. The method of claim 5, comprising:
receiving a reply message in response to the second query message but not the first query message; and
maintaining the second transmission power level or a higher transmission power level for future transmissions.

7. The method of claim 6, comprising selecting an antenna from a plurality of antennae at the first telemetry interface module.

8. A transmitting telemetry interface module comprising:
a receiver;
a transmitter;
a processor coupled with the receiver and transmitter; and
a memory coupled with the processor, having stored therein a set of instructions to cause the transmitting telemetry interface module to: transmit a first query message to a receiving telemetry interface module and receive a first reply message from the receiving telemetry interface module containing first received signal strength indicator (RSSI) data for the first query message, as received by the receiving telemetry interface module.

9. The telemetry interface module of claim 8, wherein the set of instructions comprises instructions to set a transmission power level of the transmitter to a first power level prior to transmitting the first query message, set the transmission power level of the transmitter to a second power level, and transmit a second query message to the other telemetry interface module.

10. The telemetry interface module of claim 9, wherein the set of instructions comprises instructions to receive a second reply message containing second received signal strength indicator (RSSI) data for the second query message, as received by the other telemetry interface module, and compare the second received signal strength indicator (RSSI) data to the first received signal strength indicator (RSSI) data.

11. The telemetry interface module of claim 8, comprising a plurality of antennae.

12. The telemetry interface module of claim 11, wherein at least one of the plurality of antennae are embedded in a printed circuit (PC) board.

13. A receiving telemetry interface module comprising:
a receiver;
a transmitter;
a processor coupled with the receiver and transmitter; and
a memory coupled with the processor, having stored therein a set of instructions to cause the receiving telemetry interface module to: receive a query message from a transmitting telemetry interface module, measure received signal strength indicator (RSSI) data for the query message, as received, generate a reply message containing the measured received signal strength indicator (RSSI) data, and transmit the reply message to the transmitting telemetry interface module.

14. A telemetry interface module comprising:
a receiver;
a transmitter;
a plurality of antennae coupled with an antenna of the receiver;
a processor coupled with the receiver and transmitter;
a memory coupled with the processor, having stored therein a set of instructions to receive and transmit messages; and
wherein the set of instructions comprises instructions to select a first antenna from the plurality of antennae, transmit a first query message, and receive a first reply message.

15. The telemetry interface module of claim 14, wherein at least one of the plurality of antennae are embedded in a printed circuit (PC) board.

16. The telemetry interface module of claim 14, comprising a switch coupled with the processor and the plurality of antenna.

17. The telemetry interface module of claim 14, wherein the set of instructions comprises instructions to select a second antenna from the plurality of antennae, and transmit a second query message.

18. The telemetry interface module of claim 14, wherein the set of instructions comprises instructions to receive a query message from another telemetry interface module, measure received signal strength indicator (RSSI) data for the query message, as received, generate a reply message containing the measured received signal strength indicator (RSSI) data, and transmit the reply message to the other telemetry interface module.

19. A system comprising:
  a plurality of transmitting telemetry interface modules, each comprising a receiver, a transmitter, a processor coupled with the receiver and transmitter, and a memory coupled with the processor, having stored therein a set of instructions to cause the transmitting telemetry interface module to: transmit a first query message to a data interface module and receive a first reply message from the data interface module containing first received signal strength indicator (RSSI) data for the first query message, as received by the data interface module; and
  a data interface module in communication with the plurality of transmitting telemetry interface modules, the data interface module comprising a receiver, a transmitter, a processor coupled with the receiver and transmitter, and a memory coupled with the processor, having stored therein a set of instructions to cause the data interface module to: receive a query message from a first transmitting telemetry interface module, measure received signal strength indicator (RSSI) data for the query message, as received, generate a reply message containing the measured received signal strength indicator (RSSI) data, and transmit the reply message to the first transmitting telemetry interface module.

* * * * *

UNITED STATES PATENT AND TRADEMARK OFFICE
CERTIFICATE OF CORRECTION

PATENT NO. : 7,061,398 B2
APPLICATION NO. : 10/161245
DATED : June 13, 2006
INVENTOR(S) : John K. Holmes et al.

It is certified that error appears in the above-identified patent and that said Letters Patent is hereby corrected as shown below:

In claim 16, column 14, line 63, "antenna" should read --antennae--.

Signed and Sealed this

Third Day of October, 2006

JON W. DUDAS
*Director of the United States Patent and Trademark Office*